United States Patent [19]
Koo

[11] Patent Number: 5,155,829
[45] Date of Patent: Oct. 13, 1992

[54] MEMORY SYSTEM AND METHOD FOR PROTECTING THE CONTENTS OF A ROM TYPE MEMORY

[75] Inventor: James T. Koo, Los Altos Hills, Calif.

[73] Assignee: Harry M. Weiss, Phoenix, Ariz.; a part interest

[21] Appl. No.: 483,960

[22] Filed: Feb. 9, 1990

Related U.S. Application Data

[63] Continuation of Ser. No. 214,918, Jun. 29, 1988, abandoned, which is a continuation of Ser. No. 819,753, Jan. 21, 1986, abandoned.

[51] Int. Cl.⁵ ............................................. G06F 12/14
[52] U.S. Cl. .................... 395/425; 364/DIG. 1; 364/246.9; 380/4
[58] Field of Search ............... 364/200, 900; 380/3, 380/4; 395/425

[56] References Cited

U.S. PATENT DOCUMENTS

| | | | |
|---|---|---|---|
| 3,618,040 | 11/1971 | Iwamoto et al. | 364/200 |
| 3,742,458 | 6/1973 | Inoue et al. | 364/200 |
| 4,087,856 | 5/1978 | Attanasio | 364/200 |
| 4,264,953 | 4/1981 | Douglas et al. | 364/200 |
| 4,368,515 | 1/1983 | Nielsen | 364/200 |
| 4,377,844 | 3/1983 | Kaufman | 364/200 |
| 4,433,412 | 2/1984 | Best et al. | 371/16 X |
| 4,495,575 | 1/1985 | Eguchi | 364/200 |
| 4,519,036 | 5/1985 | Green | 364/200 |
| 4,521,853 | 6/1985 | Guttag | 364/200 |
| 4,583,196 | 4/1986 | Koo | 364/900 |
| 4,646,234 | 2/1987 | Tolman et al. | 380/4 X |
| 4,716,586 | 12/1987 | Bauer | 380/3 |

OTHER PUBLICATIONS

Berkebile HE et al., "High Speed Cache in Front of Low Speed Storage", IBM Technical Disclosure Bulletin, vol. 25, No. 8, pp. 4287-4288.

Primary Examiner—David L. Clark
Attorney, Agent, or Firm—Harry M. Weiss

[57] ABSTRACT

A secure read only memory in which an external address of (n-m) bits is applied to an address controller which converts the external address into an n bit internal address which is applied to a read only memory to obtain data stored in the read only memory at the address locations. The address controller includes detector circuits for detecting improper accesses to the memory. In response to an improper access to the memory, the memory controller will produce an improper access signal which improper access signal is used to terminate operation of the system or to modify the address so that the data produced in response to the external address has essentially no direct reproducable relationship to the actual address of the memory location of the random access memory where the data is stored.

19 Claims, 4 Drawing Sheets

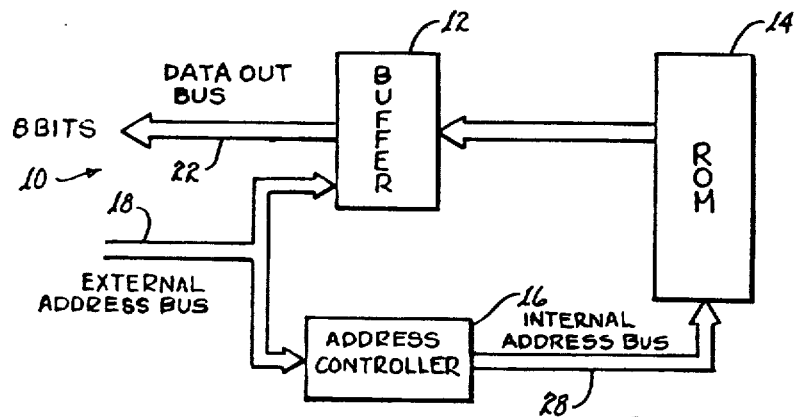
fig. 1
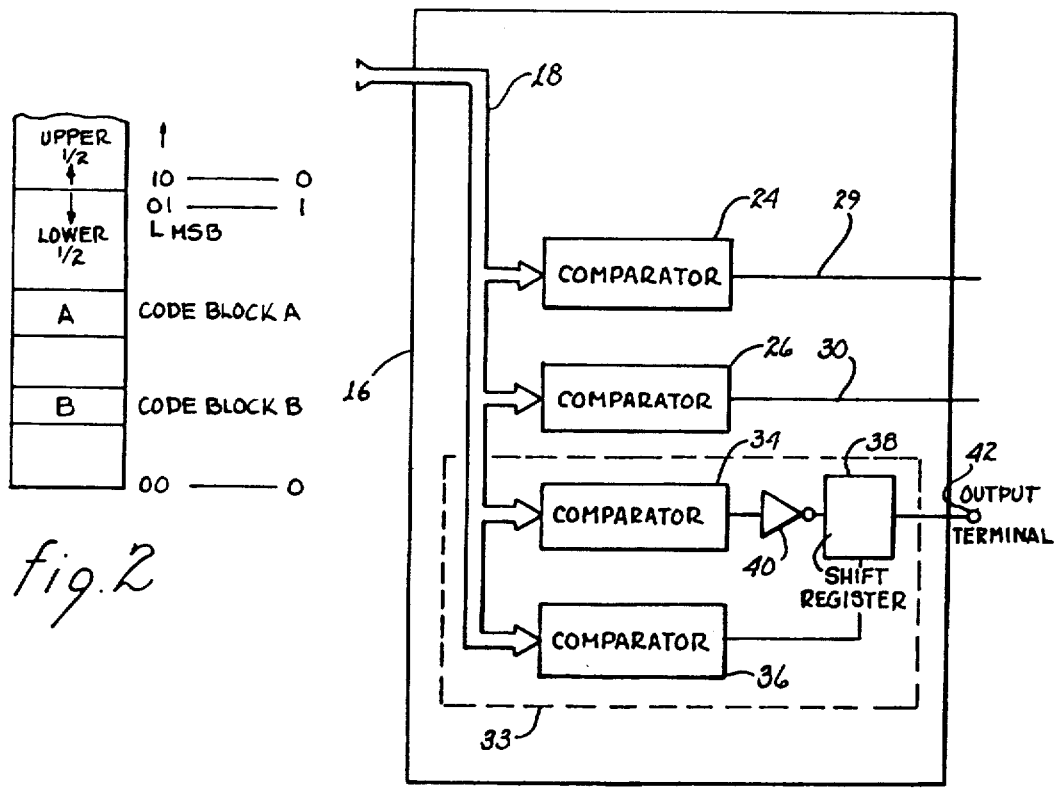
fig. 2
fig. 3

MEMORY SYSTEM AND METHOD FOR PROTECTING THE CONTENTS OF A ROM TYPE MEMORY

This is a continuation of co-pending application Ser. No. 07/214,918 filed on Jun. 29, 1988, now abandoned, which is a continuation of patent application Ser. No. 819,753; filed Jan. 21, 1986, now abandoned.

BACKGROUND OF THE INVENTION

1. Field of the Invention

This invention relates to the field of secure digital memory systems for computers and, more particularly, relates to memory systems which protect against attempts to copy the contents of a read only memory (ROM) portion of the memory system.

2. Discussion of the Related Art

Computer software or programs are often supplied to data processing users with the code embodied in a read only memory (ROM). The use of ROM based software is common in personal computers and other applications of microcomputers such as in video games and the like. ROM based software for these systems includes both systems software and application software. Because significant sums of money are required to develop the programs for such devices, the programs of which are incorporated into ROM's, a problem arises because of the ease with which the contents of a typical ROM can be read; and once the contents have been obtained, then the programming or software can be relatively easily copied to the financial detriment of the developer.

Various approaches to prevent copying of the programs stored in ROM chips have been proposed. One approach is to encrypt the addresses and the data transmitted between the ROM and the central processor unit (CPU) of a data processing system. A disadvantage of this approach is that a person who knows or can determine the encryption circuitry can defeat the encryption method and copy the software of the ROM device.

Another approach is to monitor program flow and generate address signals within the ROM itself. In this way attempts to read information from the ROM without executing the program itself are detected and only valid program execution paths are allowed. A program providing such monitoring is described in U.S. Pat. No. 4,377,844 which issued to Marc Kaufman on Mar. 22, 1983. Kaufman's patent teaches an address translating apparatus which translates an address from a conventional address register in a conventional central processing unit to an internal address for addressing the internal ROM memory. The address translating apparatus includes means which are responsive to a current external memory address and a signal generated in response to a previous memory address to provide the current internal memory address. Kaufman's address translating apparatus also requires the use of an auxiliary memory device. The problem with the Kaufman address translator is that it requires a complicated arrangement of counters and address generation circuits to accomplish the desired result. The complexity of this circuitry makes it impractical for use in a inexpensive ROM based software package.

Thus, a need has been felt for a relatively simple system to prevent programs stored in ROM devices from being copied, a system that is relatively economical to implement and which does not interfere with the operation of the computer systems that utilizes the memories.

SUMMARY OF THE INVENTION

It is therefore an object of this invention to provide a secure memory system in which attempts to improperly access the programs stored in the system are detected and an appropriate action to counter the attempt is made.

It is another object of this invention to provide a secure memory system which is relatively simple to implement and thus significantly less costly than more complex systems.

It is yet another object of this invention to provide a secure memory system in which the addresses applied to the system are relative addresses and which includes techniques for detecting attempts to access the memory in a way that is inconsistent with the manner in which the data is recorded in the nonvolatile memory portion of the system.

The aforementioned and other objects of the present invention can be obtained by a digital memory system in which the nonvolatile memory (ROM) of the system will have $2^n$ addressable memory locations. Thus, an n-bit address is required to address each of the memory locations of the ROM. A buffer memory, or equivalent, is also provided. The buffer memory is a read write, or random access memory (RAM), memory which is smaller, i.e., has fewer addressable memory locations, than the ROM memory. Both the ROM memory and buffer memory store the same number of bits in each addressable memory location. An external address of n-m bits is applied to the memory system from a central processor unit, for example, and is used to address the buffer memory. The value of m is determined by the relative size of the buffer memory. An address controller is provided to which the external addresses are applied. In response to certain predetermined external addresses, the controller will cause the contents of a portion of the read only memory to be transferred into the buffer memory. The address controller, however, will only apply the external addresses received by the address controller to the buffer memory. As a result, the external address on the address bus is the address of a memory location in the buffer memory, the contents of buffer memory changing as a function of certain predetermined conditions occurring; i.e., certain addresses or address sequences being applied to the address controller. Thus, attempts to obtain the contents of a memory location from the buffer memory will not necessarily reproduce the same data each time an addressable location in the buffer memory is addressed. This arrangement also has the advantage of expanding, or increasing, the size of the memory addressable by a system with n-m address signals. In addition, the address controller is provided with means for detecting certain addresses which should not be used at any time, such as that of an unused location, or for detecting when the external addresses as applied to the controller in an improper manner or sequence. When improper attempts to address the memory system are executed, the addresses applied to the buffer memory are no longer in proper sequence (although the deviation from a correct program sequence is not immediately evident). The data read out of the memory system no longer had a reproducable correlation between the externally applied addresses and the information stored in the ROM memory.

BRIEF DESCRIPTION OF THE DRAWINGS

FIG. 1 is a schematic block diagram of the secure memory system of the invention;

FIG. 2 is a memory map of a portion of the read only memory chip illustrated in FIG. 1;

FIG. 3 is a schematic block diagram of the address controller of FIG. 1;

DETAILED DESCRIPTION OF THE PREFERRED EMBODIMENT

Figure 4:
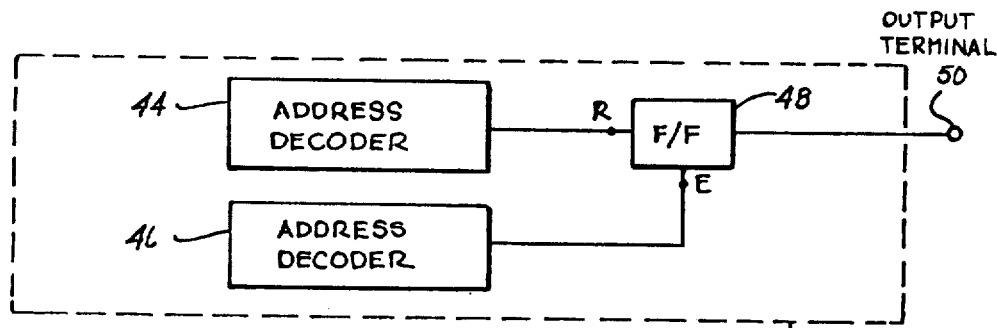
FIG. 4 is a schematic block diagram of a modification of a circuit for detecting improper sequences of data access.

Software programs as stored in nonvolatile memory devices such as ROM semiconductor components or erasable ROM (EPROM) semiconductor components have certain characteristics which can be used to detect improper accesses to the information stored in the nonvolatile memory. An improper access would typically occur when someone is attempting to copy the contents of the memory component. Typically software blocks or blocks of information contained in the nonvolatile memory must be executed in a predetermined sequence which may or may not be sequentially stored in the ROM or EPROM. For example, the computer system of which the system of this invention is a portion, must be initialized and data fetched before computation begins. However, data on which the permitted programs operate may not be stored in any predetermined physical relationship to the instructions in the ROM memory or EPROM memory of the system of this invention.

Typically, the data on which the programs are operating or which are produced, are often of finite and predetermined size, an example being social security numbers which always have a fixed number of digits. Other portions of the program stored in the ROM memory cannot be accessed unless a jump or branch instruction is executed which then designated the next memory location. This is often the case immediately following an unconditional jump, or end of a program, for example. Typically a software program may repeat a certain portion of the program for a certain number of times (looping). A person trying to obtain a copy of the program as stored in the ROM is not likely to repeat these loops the exact number of times as would be the case when the program is being executed properly.

Referring to FIG. 1, secure memory system 10 is provided with a buffer memory 12. Data from ROM 14 can only be read out of system 10 after it has been written into buffer memory 12. As a result, there is no direct access to information stored in the nonvolatile ROM memory 14. The loading of data into buffer memory 12 from nonvolatile memory 14 is controlled by address controller 16. ROM 14 in the preferred embodiment has 16 k bytes of data stored at 16 k addressable locations of ROM 14 (where k equals 1024). A byte of data in the preferred embodiment is 8 data bits. Buffer memory 12 has 8 k of addressable memory locations each of which store a byte of binary data. The external address from the address register of the central processor unit of a conventional data processing system, for example, of which the secure memory system 10 forms a part will produce a 13 bit external address. The 13 bit external address is applied to address controller 16 and to buffer memory 12 over external address bus 18. The application of an address plus appropriate control signals, as is well known in the computer arts, causes buffer memory 12 to extract the data signals stored at the addressed memory location, which data is transmitted over data out bus 22 to the CPU, for example.

Referring now to FIG. 3 in which additional details of address controller 16 are illustrated, the first 8 k block of information from ROM 14 is loaded into the buffer memory 12 as a part of the initialization sequence of the memory system 10. In the example given here, the first 8 k can be the lower half of the addressable memory locations of ROM 14, those in which the most significant bit of the 14 bit address for ROM 14 is a logical zero. The upper half of the addressed memory locations of ROM 14 are those whose most significant bit, bit 14, is a logical one as illustrated in FIG. 2. The second or upper memory half 8 k block of information can be transferred to the buffer memory 12 any time an appropriate address is identified by the memory system associated with the ROM memory. In the simplest example of a memory partitioned into two sections, the upper half of memory contents (an 8 k block of information) can be transferred when the last address of the lower memory half is accessed. The first or lower half 8 k block of information from ROM 14 can be transferred to the buffer memory when the first location of the buffer memory 12 is accessed. More generally, signals from any group of ROM memory location can be stored in the buffer memory upon initialization of the system, and any portion of the stored ROM memory data signals can be transferred to the buffer memory upon identification of any preselected address. This identification function can be implemented by the circuit illustrated in FIG. 3 where address comparators 24 and 26 monitor the external addresses applied to controller 16 for the first and last addresses of buffer memory 12. Comparators 24 and 26 can be implemented by conventional comparators in which the first and last addresses of buffer memory 12 are stored. The address of the first addressable location of ROM 14 would be that corresponding to that in which all thirteen bits of the address are zeros and the address of the last addressable location of ROM 14 would be that in which all thirteen bits of the external address are logical ones. When the external address is all logical zeros, decoder 24 will produce an output signal, a logical one, for example, which is applied over data path 29 to ROM 14. This signal causes ROM 14 to transfer and write into buffer memory 12 the first 8 k bytes stored in ROM 14, or the lower half of the contents of ROM 14. An output from comparator 26 on data path 30 when the external address is all logical ones will cause ROM 14 to write into buffer memory 12 the 8 k bytes of data in the upper half of ROM 14. Operated properly, the address controller 16 can load the buffer memory with appropriate data for retrieval.

The capability provided by address comparators 24 and 26 provides a limited degree of protection against copying the contents of ROM 14 since the same external address applied to address controller 16 will have different data stored in the same memory locations of buffer 12 at different times. In the preferred embodiment, additional addresses can be used to load data from ROM 14 into buffer memory 12 to increase the degree of protection for the software stored in ROM 14. The contents of the comparators 24 and 26 can be reloaded each time when new information is loaded into the buffer memory so that the addresses causing the loading action of the buffer memory can change as different blocks of information are loaded into the buffer memory. This particular capability also provides for memory expansion so that 16 k, 32 k, or 64 k bytes of data can be retrieved from memory system 10 using only a 13 bit external address.

A higher level of security can be obtained if memory address sequence in addition to addresses are used to cause different information to be loaded into the buffer memory. If in the execution of a software sequence there is a code block A as illustrated in FIG. 2 which must be executed before block B but is in fact stored physically behind or above block B block A must be accessed before block B will be permitted access. However, sequential accessing of buffer memory 12, such as would occur during copying, for example, would try to access code block B before A. If this occurs, then improper access detectors circuit 33 which includes address comparators 34 and 36 of address controller 16 can be used to differentiate between a proper access and an improper access of blocks A and B.

In FIG. 3 address comparator 34 monitors an address in code block A, i.e. the address of one of the memory locations in code block A is stored in the comparator 34, for example. Address comparators 36 monitors one or more addresses in code block B, i.e. it has stored in its comparator the address of one or more of the addressable memory locations in block B. At initialization a logical 1 will be stored in one bit shift register 38. At such time as the address of block A which is stored in address comparator 34 is applied to comparator 34 over bus 18, address comparator 34 will produce a logical 1 signal which is inverted by inverter 40 so that a logical zero is written into shift register 38. At such time as address comparator 36 detects the address in block B that is stored in it, then comparator 36 will produce a logical 1 which causes the contents of shift register 38 to appear at its output terminal 42. A logical zero at terminal 42 indicates a legal or proper access of the secure memory system; however, a logical 1 which would be produced if block B is accessed before block A, will cause a logical 1 signal to be present at terminal 42. A logical one at terminal 42 indicates an improper access to secure memory system 10. The presence of the logical 1 signal at terminal 42 can then be used, as will be described later, to cause the secure memory system 10 to cease operating properly by loading data other than block A into the buffer memory.

Referring to FIG. 4, a different embodiment of a circuit for detecting an improper access, detector circuit 43, to the location in block A stored in it and decoder 46 will have an address in decoder block B stored in it, for example. The output of decoder 44 is applied to the reset terminal R of flip-flop 48 and the output of decoder 46 is used to enable the output of flip-flop 48 to appear at output terminal 50. On initialization flip-flop 48 will be set so that its output, if enabled, would be a logical one. A signal from decoder 44 which monitors an address in code block A will reset flip-flop 48 to a logical zero. A signal from decoder 46 which monitors an address in code block B will cause the state of flip-flop 48 to be present at output terminal 50. If secure memory system 10 is properly accessed, i.e. code block A is accessed before code block B, then a logical zero will appear at output 50. If code block B is accessed before code block A, then a logical one will appear at output terminal 50 which signals that an illegal, or improper, access has been made to secure system 10. The signal at output terminal 50, like that at output terminal 42, can be used to cause memory system 10 to cease operating or to cause it to malfunction so that erroneous data is present on output data bus 22.

Figure 12:
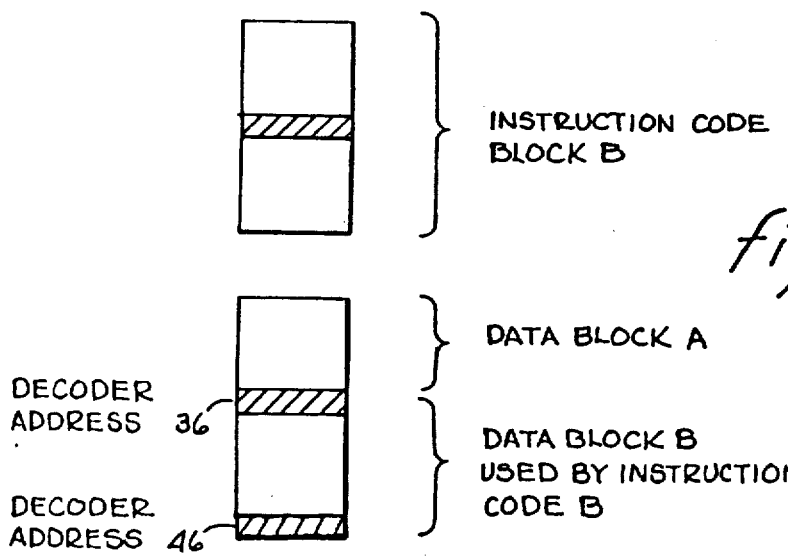
FIG. 12 is a portion of a memory map used to illustrate the addresses monitored to detect incorrect accessing of data of known size.

Detecting an improper access of data of known size can be achieved by the use of two detecting circuits 33, or two detecting circuits 43, as illustrated in FIGS. 3 and 4, or one of each type. To perform this function using one of each type, address comparators/decoders 36 and 46 would monitor an address which is immediately before and after the data to be retrieved as illustrated in the portion of the memory map illustrated in FIG. 12.

It is also possible that certain memory locations of ROM 14 are intentionally not used. Any access of these locations will indicate an illegal or improper access of secure memory system 10 which activates the defensive circuits of this invention. To accomplish this, improper access detection circuits 33 and 43 can be used, or duplicates of them, by storing in decoders 36 and 46 the addresses of memory locations which are intentionally not used and by having comparator/decoders 34 and 44 disabled so that they will always produce a logical zero. As a result an improper access signal will be produced at terminals 42 and 50 any time that these unused memory locations are addressed over external address bus 18.

Figure 5:
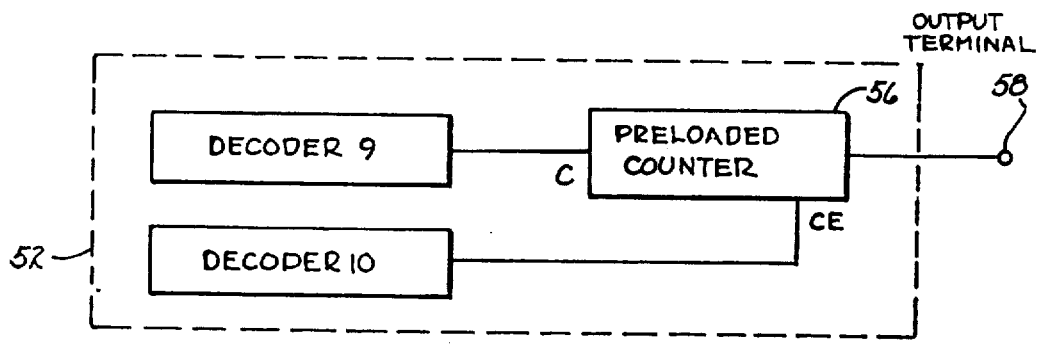
FIG. 5 is a schematic block diagram of the circuit for detecting improper access to data as a result of not executing the proper number of program loops.

In FIG. 5 there is illustrated another embodiment of an improper access detector circuit 52 that can be used for detecting an improper access to a loop if the loop is not executed the number of times that it should be in the proper operation of a computer system of which memory system 10 is a part. A person who is attempting to copy the contents of ROM 14 is not likely to perform the loop, or branch, the intended number of times assuming he is even aware of their existence and the exact number of times it is repeated in the normal execution of the program. Detector circuit 52 illustrated in FIG. 5 is similar to that of the improper access detectors 33 and 43 illustrated in FIGS. 3 and 4 with the replacement of 1 bit shift register 38 or flip-flop 48 by a conventional counter circuit 56 in which the number of times that the loop is to be executed is stored. Unless the loop is executed the exact number of times as specified an error signal will appear at detector circuit 52's output terminal 58.

Figure 6:
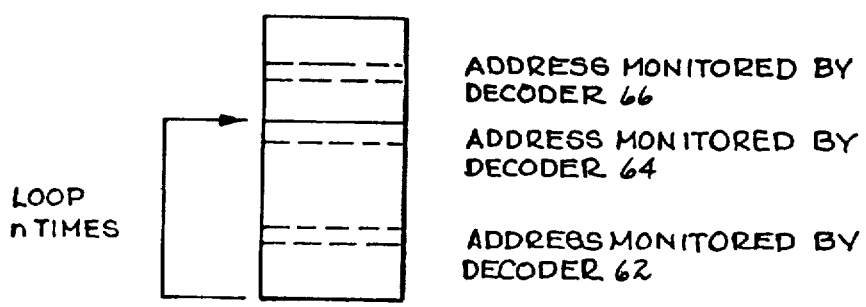
FIG. 6 is a portion of a memory map used to illustrate the function of the circuits for detecting improper access of FIGS. 5 and 7.
Figure 7:
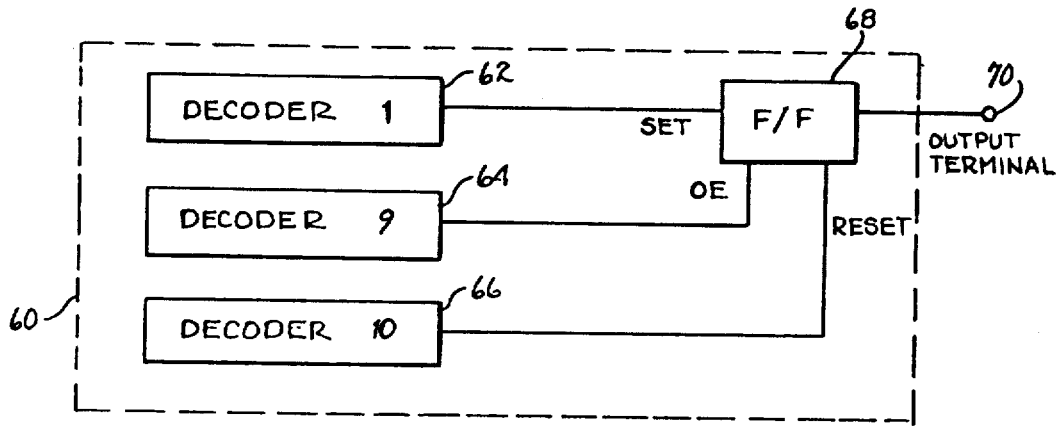
FIG. 7 is a schematic block diagram of a circuit for detecting an improper sequence of data access.

In FIG. 7 there is illustrated a more generalized improper access detector circuit 60 which can be included in the address controller 16. Detector circuit 60 includes decoders 62, 64 and 66 which have their outputs connected to flip-flop 68. To detect each time a given sequence is executed, decoder 62 monitors an address location as illustrated in FIG. 6, decoder 64 will monitor another address location and decoder 66 will monitor a third address imbedded within the sequence code. If the sequence of addresses is the address monitored by decoder 62 followed by the address monitored by decoder 66 followed by the address monitored by decoder 64, a logic "0" signal is applied to the output terminal of flip flop 68 and the correct sequence can continue. However, if the sequence is the address monitored by decoder 62 followed by the address monitored by decoder 64, then followed by the address monitored by decoder 66, then a logic "1" signal is applied to the output terminal of flip-flop 68 and an incorrect sequence is initiated.

Figure 8:
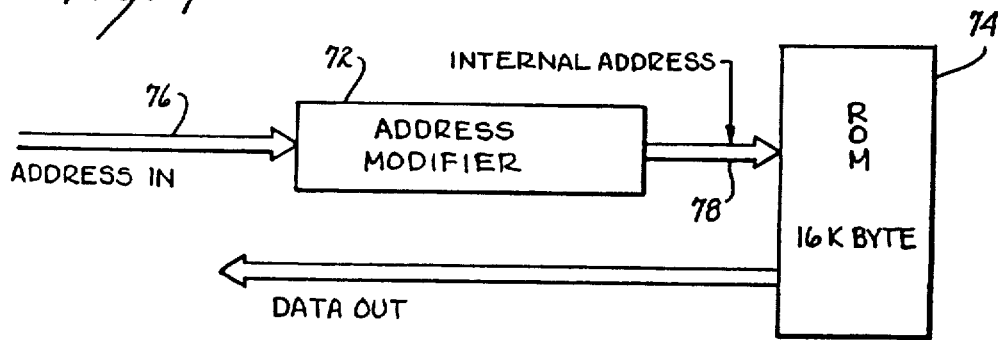
FIG. 8 is a schematic block diagram of a modification of the invention in which the external addresses are applied to a programmable address modifier before being directly applied to the ROM.

FIG. 8 shows an alternative method to implement the solution of providing a secure memory system. In this case, programmable address modifier 72 emulates a buffer memory. Instead of loading different blocks of data from ROM 74 into a buffer memory, the input or external address is modified to address or point to different blocks of ROM 74 with results that are functionally the same as when a buffer memory is used. For purposes of discussion, the ROM 74 is assumed to have 16 k addressable memory locations each having a byte of data with the external address on address bus 76 being a 13 bit address. When initially powered up or initialized, programmable address modifier 72 will append to the external address applied over on address bus 76 an additional bit, the most significant bit of the address, bit 14. Under the foregoing circumstances a logical zero provides access to the lower 8 k bytes of ROM 74. It is assumed that access to the second or upper 8 k bytes of data stored in ROM 74 is required when the last address of the first 8 k byte is reached. Access of the first or lower half of 8 k bytes is required when the address of the initial memory location, i.e. all logical zeros, is applied to programmable address modifier 72 over external address bus 76. Two of the circuits such as are illustrated in FIG. 7 can be used or incorporated in the programmable address modifier 72 with one of the decoders 62 monitoring the first input address and decoder 66 monitoring the last address of the input address. The decoder 64 would be activated all the time, for this purpose. The output of F/F 68 on output terminal 70 will be used for setting and resetting the most significant bit of the internal address on internal address bus 78. Any of the improper access detectors such as 33, 43, 52 or 60 can be incorporated in programmable address modifier 72 and at such time as an improper access signal is produced by any of these detectors then the signal produced by them can be used to modify the internal address on internal address bus 78. The programmable address modifier 72 emulation of the buffer memory provides a virtual storage memory or means.

Figure 9:
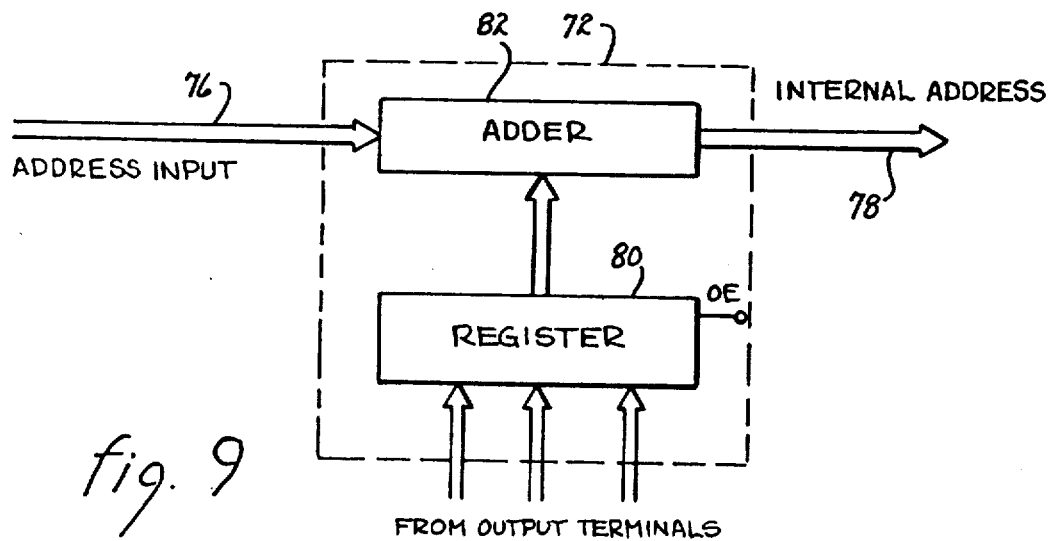
FIG. 9 is a schematic block diagram of one version of the programmable address modifier.

In FIG. 9 there is illustrated a circuit for modifying the external address at such time as an improper access address is sensed by any one of the improper address detector circuits. Any given number of bits can be stored in register 80 and when an improper access is detected the contents of register 80 are added to physical address by conventional adder 82 to form the internal address on internal address bus 78. This, of course, will result in improper data being read out of the ROM.

Figure 10:
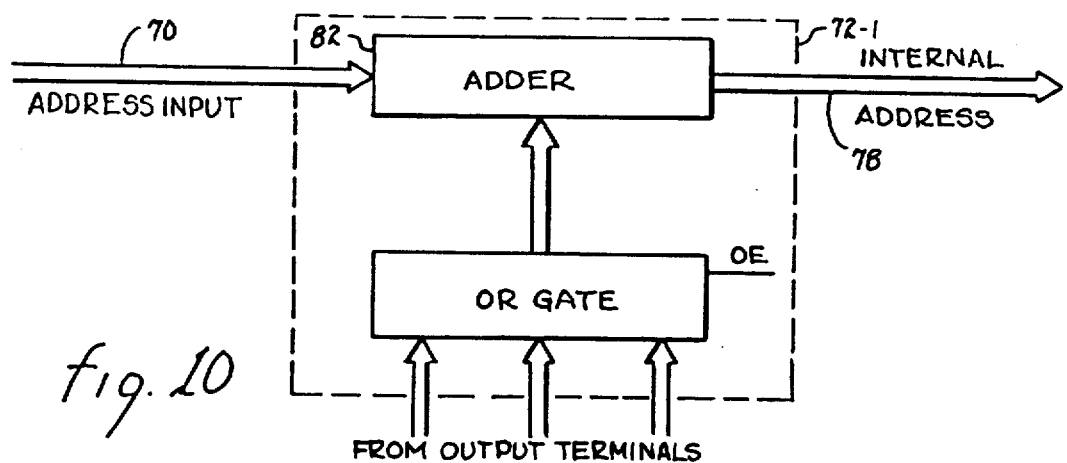
FIG. 10 is a schematic block diagram of another version of the programmable address modifier of FIG. 8.

Another modification is illustrated in FIG. 10 in which a plurality of registers, one for each improper access detector incorporated into address modifier 72, are used, but not illustrated. Each register will have a different binary number stored in it and when enabled by one of the improper access detectors 33, 43, 52, the contents of the enabled register will be added to the external address on bus 76 to produce an erroneous internal address on bus 78.

Figure 11:
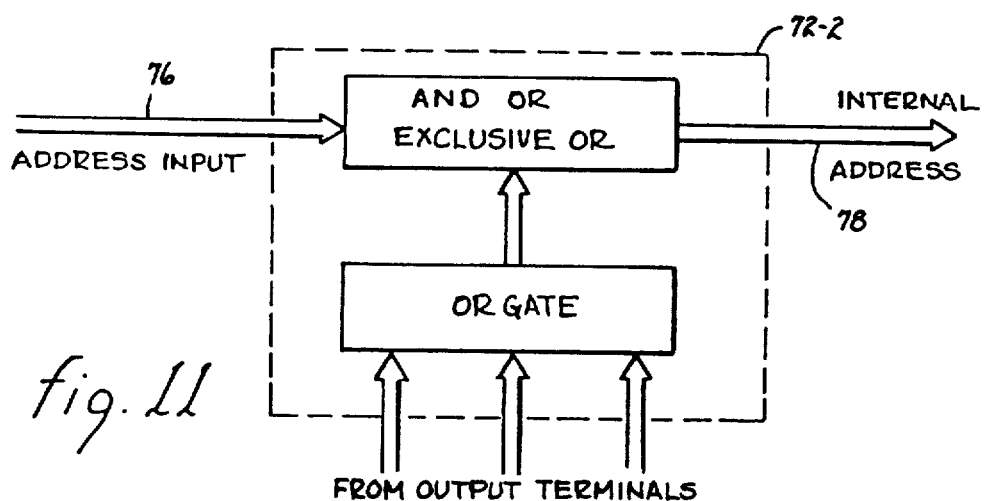
FIG. 11 is a schematic block diagram of yet another version of the programmable address modifier.

In FIG. 11, another modification is illustrated in which the contents of one of a plurality of registers are combined using any one of the logical function with the external address whenever an improper access to the memory system is detected. As a result, the difficulty of correctly copying the contents of the secure memory system of this invention is significantly increased.

The foregoing discussion is included to illustrate the operation of the preferred embodiment and is not meant to limit the scope of the invention. The scope of the invention is to be limited only by the claims. From the foregoing discussion, many variations will be apparent to those skilled in the art that would yet be encompassed by the spirit and scope of the invention.

I claim:

1. A memory system for protecting the contents of a read-only memory ("ROM"), the memory system comprising:

a ROM having a data output and an address input;

an addressable buffer having a data output, a data input coupled to the data output of the ROM, and an address input, said addressable buffer having storage capacity sufficient to accommodate a substantial portion of the contents of the ROM:

address controller means having an address output coupled to the address input of the ROM and having an address input;

an external address bus coupled to the address input of the address controller means and to the address input of the buffer, said address controller means for detecting a first external address and causing a first substantial portion of the contents of the ROM to be written into the addressable buffer in response to detection of the first external address and for detection a second external address and causing a second substantial portion of the contents of the ROM to be written into the addressable buffer in response to the detection of the second external address;

the contents of the ROM include a first code block corresponding to a first range of addresses and a second code block corresponding to a second range of addresses and wherein the address controller means comprises:

a first address detector for storing a first address selected from addresses in the first range of addresses;

a second address detector for storing a second address selected from addresses in the second range of addresses; and means coupled to the first address detector and to the second address detector for generating an alarm signal when the second address detector detects an external address equal to the second address before the first address detector detects an external address equal to the first address.

2. A memory system as defined in claim 1 wherein the address controller means comprises a first comparator means for detecting the first external address and a second comparator means for detecting the second external address.

3. A memory system as defined in claim 2 wherein the first comparator means having means for detecting an external address representing a first addressable location of the ROM and, in response thereto, to cause lower portions of the contents of the ROM to be written into the addressable buffer, and the second comparator having means for detecting an external address representing a last addressable location of the ROM and, in response thereto, to cause upper portions of the contents of the ROM to be written into the addressable buffer.

4. A memory system as defined in claim 1 wherein the alarm signal is applied to the ROM and causes erroneous data to appear at the output of the addressable buffer.

5. A memory system for protecting the contents of a read-only-memory ("ROM"), the memory system comprising:
   a ROM having a data output and an address input;
   an addressable buffer having a data output, a data input coupled tot he data output of the ROM, and an address input, said addressable buffer having storage capacity sufficient to accommodate a substantial portion of the contents of the ROM;
   an external address bus coupled to the address input of the buffer; and
   an improper access detector circuit having:
   (i) a first address detector means for storing a first address selected from addresses in a first range of addresses that correspond to a first code block included in the ROM;
   (ii) a second address detector means for storing a second address selected form addresses in a second range of addresses that correspond to a second code block included in the ROM; and
   (iii) sequential logic means coupled to the first address detector means and to the second address detector means for generating an alarm signal when the second address detector means detects an eternal address equal to the second address before the first address detector means detects an external address equal to the first address.

6. A memory system as defined in claim 5 wherein the alarm signal is applied to the ROM and causes erroneous data to appear at the output of the addressable buffer.

7. A memory system as defined in claim 6 wherein the first and second address detector means are comparators and the logic means is a shift register.

8. A memory system as defined in claim 6 wherein the first and second address detector means are address decoders and the logic means is a flip-flop.

9. A memory system for protecting the contents of a read-only-memory ("ROM"), the memory system comprising:
   a ROM having a data output and an address input;
   an addressable buffer having a data output, a data input coupled to the data output of the ROM, and an address input, said addressable buffer having storage capacity sufficient to accommodate a substantial portion of the contents of he ROM;
   an external address bus coupled to the address input of the buffer; and
   improper access detector means coupled to the external address bus for sensing the number of times a program loop is executed and for producing an alarm signal when the program loop is not executed a predetermined number of times.

10. A memory system as defined in claim 9 wherein the improper access detector means includes (i) counter means for reloading with the predetermined number and (ii) first and second decoders coupled to the external address bus and to the counter means.

11. A memory system for protecting the contents of a Read-Only-Memory ("ROM"), the memory system comprising:
   a ROM having an address input and a data output, said ROM having a storing code that includes a firstcode block corresponding to a first range of addresses and a second code block corresponding to a second rang of addresses, and
   improper access detector means for coupling to an external address bus and coupled to the address input of the ROM and for:
   (a) storing a first address selected from addresses in the first range of addresses,
   (b) storing a second address selected from the addresses in the second range of addresses,
   (c) comparing a plurality of external addresses to the second address, and
   (d) generating an alarm signal when an external address equal to the second address is detected before an external address equal to the first address is detected, said alarm signal causing erroneous data to appear at the data output of the ROM.

12. A memory system as defined in claim 11 further comprising address modifier means having a first input for coupling to an external address, a second input coupled to said improper access detector means, and output means coupled to the address input of the ROM for applying an internal address to the ROM, the address means modifier means including means responsive to the alarm signal so as to generate an internal address different from the external address and thereby cause erroneous data to appear at the output of the ROM.

13. A memory system as defined in claim 12 wherein said improper access detector means comprises:
   first address detector means for storing a first address selected from the addresses in the first range of addresses;
   second address detector means for storing a second address selected form the addresses in the second range of addresses; and
   means coupled to the first address detector means and to the second address detector means for generating an alarm signal when the second address detector means detects an external address equal to the second address before the first address detector means detects an external address equal to the first address.

14. A memory system for protecting the contents of a Read-Only Memory ("ROM"), the memory system comprising:
   a ROM having an address input and a data output;
   an address modifier adapted for coupling to an external address and coupled to the address input of the ROM for applying an internal address to the ROM: and
   improper access detector means adapted for coupling to the external address and coupled to the address modifier for selectively generating an alarm signal and applying the alarm signal to the address modifier so that the address modifier modifies the external address and applies an internal address to the address input of the ROM so that erroneous data appear at the data output of the ROM, said improper access detector means operable to generate an alarm signal in response to at least one of the following conditions:

(A) A program loop is not executed a predetermined known number of times;
(B) A block of data is accessed, which block of data is of a size different form a predetermined known size;
(C) An external address is detected, which eternal address is known never to accessed int eh course of proper operation of the memory system;
(D) At least three predetermined known external addresses are applied to the memory system and the sequence in which those addresses are applied is improper;

the improper access detector means includes (i) a counter for preloading with the predetermined known number and (ii) first and second decoders adapted for coupling to an external address and coupled to the counter.

15. A memory system for protecting the contents of a Read-Only Memory ("ROM"), the memory system comprising:

a ROM having an address input and a data output;
an address modifier adapted for coupling to an external address and coupled to the address input of the ROM for applying an internal address to the ROM; and
improper access detector means adapted for coupling to the external address and coupled to the address modifier for selectively generating an alarm signal and applying the alarm signal to the address modifier so that the address modifier modifies the external address and applies an internal address to the address input of the ROM so that erroneous data appears at the data output of the ROM, said improper access detector means operable to generate an alarm signal in response to at least one of the following conditions;

(A) A program loop is not executed a predetermined known number of times;
(B) A block of data is accessed, which block of data is of a size different from a predetermined known size;
(C) An external address is detected, which external address is known never to be accessed in the course of proper operation of the memory system;
(D) At least three predetermined known external addresses are applied to the memory system and the sequence in which those addresses are applied is improper;

the improper access detector means includes (i) a sequential logic element (68), and (ii) first, second and third decoders means (62, 64, and 66) coupled to inputs of the sequential logic element so that an alarm signal is generated when at least three predetermined known external addresses are applied to the decoders and the sequence in which the addresses are applied is improper.

16. In a memory system that includes a Read-Only-Memory ("ROM") that has an address input and a data output, which ROM stores a first block of code corresponding to a first range of address and stores a second block of code corresponding to a second range of addresses, a method of protecting the contents of the ROM, comprising the steps:

(a) storing a first address selected from addresses in the first range of addresses;
(b) storing a second address selected form the addresses in the second range of addresses;
(c) generating an alarm signal when an external address equal to the second address is detected before an external address equal to the first address is detected; and
(d) causing erroneous data to appear at the data output of the ROM in response to the alarm signal.

17. A method as defined in claim 16 wherein erroneous data is caused to appear at the data output of the ROM by modifying an external address and applying the modified address to the address input of the ROM.

18. In a memory system that includes a Read-Only-Memory ("ROM") and that includes an input for external addresses and a data output, a circuit for protecting the contents of the ROM, said circuit comprising:

first means for detecting a first predetermined address and for generating a first logic signal in response to the detection of the first address;
second means for comparing, to a second predetermined address, a plurality of external address that are applied to the memory system after the detection of the first known address and for generating a second logic signal in response to a condition of equality between any one of the plurality of external addresses and the second address, said second address corresponding to a location in the ROM that is above a location corresponding to the first predetermined address; and
logic means coupled to the first means and to the second means for generating an alarm signal when the second logic signal is generated subsequent to the first logic signal, said alarm signal causing erroneous data to appear at the data output of the ROM.

19. A circuit as defined in claim 18, further comprising address modifier means having an input adapted for coupling to an external address and having means for modifying an external address in response to said alarm signal so as to cause erroneous data to appear at the output of the memory system.

* * * * *

UNITED STATES PATENT AND TRADEMARK OFFICE
CERTIFICATE OF CORRECTION

PATENT NO. : 5,155,829  Page 1 of 2
DATED : 10-13-92
INVENTOR(S) : James T. Koo

It is certified that error appears in the above-identified patent and that said Letters Patent is hereby corrected as shown below:

IN THE CLAIMS:
Column 8:

Claim 1, line 20, change "detection" to -- detecting --.
Column 9:
Claim 5, line 2, change "read-only-memory" to -- read-only memory --.
       line 6, change "tot he" to -- to the --.
       line 18, change "form" to -- from --.
       line 25, change "eternal" to -- external --.

Claim 9, line 2, change "read-only-memory" to -- read-only memory --.
       line 9, change "he" to -- the --.
Column 10:
Claim 10, line 3, change "reloading" to -- preloading --.

Claim 11, line 2, change "Read-Only-Memory" to --Read-Only Memory--.
       line 6, change "firstcode" to -- first code --.
       line 8, change "rang" to -- range --.

Claim 12, line 7, omit "means", first occurrence.

Claim 13, line 7, change "form" to -- from --.

Claim 14, line 23, change "form" to -- from --.
       line 25, change "eternal" to -- external --.
       line 26, change "int eh" to -- in the --.

UNITED STATES PATENT AND TRADEMARK OFFICE
CERTIFICATE OF CORRECTION

PATENT NO. : 5,155,829

DATED : 10-13-92

INVENTOR(S) : James T. Koo

It is certified that error appears in the above-identified patent and that said Letters Patent is hereby corrected as shown below:

Column 12:
Claim 16, line 1, change "Read-Only-" to --Read-Only--;
         line 10, change "form" to --from--.

Claim 18, line 1, change "Read-Only-" to --Read-Only--;
         line 9, change "address" to --addresses--.

Signed and Sealed this

Ninth Day of November, 1993

Attest:

BRUCE LEHMAN

Attesting Officer    Commissioner of Patents and Trademarks